(No Model.) 2 Sheets—Sheet 1.

H. FRASCH.
PROCESS OF AND APPARATUS FOR THE FRACTIONAL DISTILLATION OF HYDROCARBON OILS.

No. 281,045. Patented July 10, 1883.

WITNESSES

INVENTOR
Herman Frasch
By Liggett & Liggett
ATTORNEYS

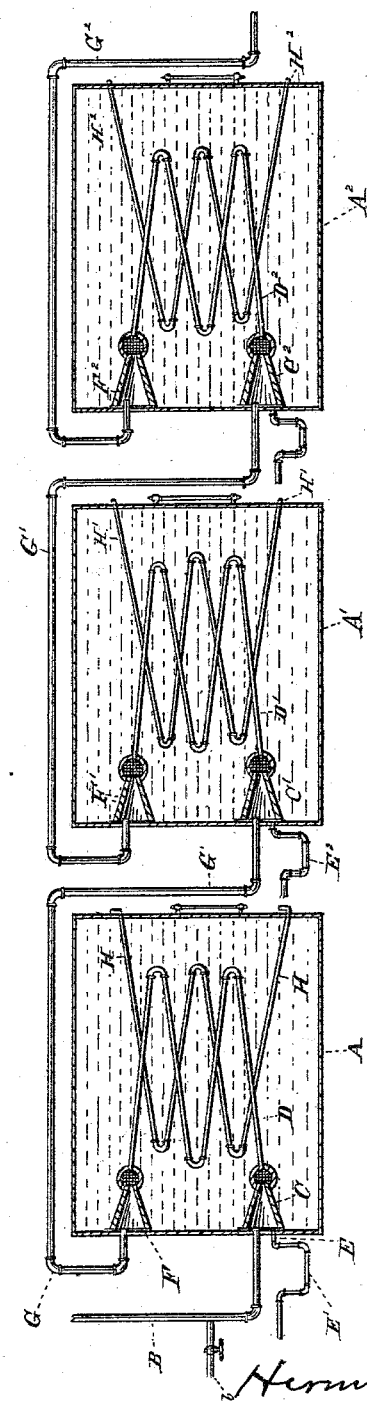

UNITED STATES PATENT OFFICE.

HERMAN FRASCH, OF CLEVELAND, OHIO.

PROCESS OF AND APPARATUS FOR THE FRACTIONAL DISTILLATION OF HYDROCARBON OILS.

SPECIFICATION forming part of Letters Patent No. 281,045, dated July 10, 1883.

Application filed April 26, 1882. (No model.)

*To all whom it may concern:*

Be it known that I, HERMAN FRASCH, of Cleveland, in the county of Cuyahoga and State of Ohio, have invented certain new and useful Improvements in Process of and Apparatus for the Fractional Distillation of Hydrocarbon Oils; and I do hereby declare the following to be a full, clear, and exact description of the invention, such as will enable others skilled in the art to which it pertains to make and use the same.

My invention relates to a process and apparatus for the fractional distillation of hydrocarbon oils; and it consists in introducing into the vapor from the still a vapor for which hydrocarbon oil has little or no affinity, and passing together such vapors through a series of condensers of different temperatures.

It further consists in an apparatus embodying certain features of construction and combinations of parts, as will hereinafter be described, and pointed out in the claims.

The invention herein described and claimed is an improvement upon that for which Letters Patent No. 231,420 were granted me August 24, 1880, and for the more perfect understanding of the present invention reference is made to said Letters Patent.

Figure 1:
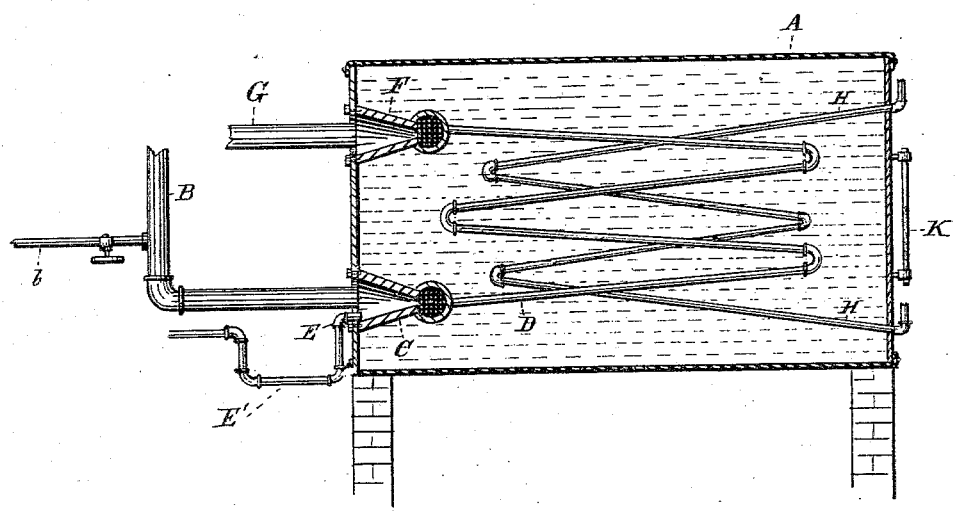
Figure 2:
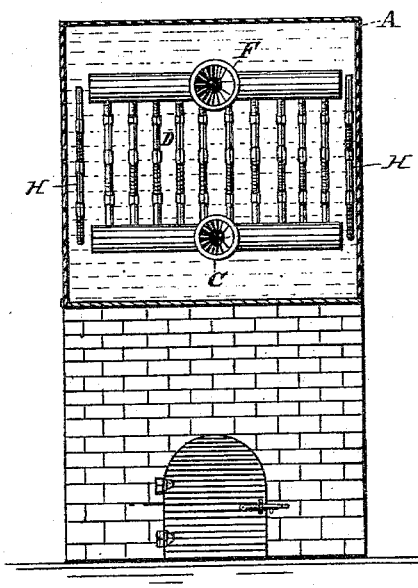

In the drawings, Figure 1 is a vertical sectional view of a condenser used in carrying out my process. Fig. 2 is a view in end elevation, partly in section, of the same. Fig. 3 is a longitudinal vertical section of three condensers coupled together and adapted for use in carrying out my process.

In the said drawings, A represents a primary condenser connected with a still by means of a pipe, B. This pipe, at any convenient point, is supplied with a pipe, $b$, for the introduction of a vapor or gas for which the hydrocarbons have no or very little affinity. I prefer to use steam, as it is the cheapest and most accessible; but any other gas or vapor for which the hydrocarbons have little or no affinity would answer every purpose.

C is a conical or funnel shaped pipe connecting the tubes D with the casing of the condenser, and through which the vapor from the pipe B passes to the manifold tubes D. A second pipe, E, is also introduced into the conical-shaped pipe C, for the purpose of drawing off the product that may be condensed in the condenser A. This is supplied with a trap to prevent the influx of air or the gases of the uncondensed vapors from escaping. Each condenser of the series or system should be supplied with such a pipe and trap, and the description of the construction of one of the condensers A will answer for all, as they should all be supplied with the same mechanical devices.

F is a conical outlet-pipe, with which communicate the upper ends of the pipes D, through which passes the vapor that is not condensed into the pipe G, and from thence to the next condenser.

H represents a pipe extending through the bath in the condenser A. This pipe is employed for conducting water through the bath in order to lower the temperature of the bath to any desired degree and maintain it at an even and uniform temperature. This is done by reason of the fact that the highly-heated vapor from the still tends to raise the temperature of the bath, so that it would not serve to condense the vapors, and hence by the employment of a cooling agent, as set forth, the temperature of the bath may be reduced and retained uniform and constant. A thermometer, K, is connected with the condenser A, for the purpose of indicating the temperature of the bath.

The following is a good method of carrying out my invention: The bath in the condenser A is heated to 600°, A' to 400°, and $A^2$ to 200°. Vapor from the still, which has been heated to about 800°, enters the condenser A through the pipe B, and with the vapor I introduce steam at any convenient point, as at $b$. This vapor and steam pass through the manifold pipes D, and soon have acquired the temperature of the bath, and all vapor of the oil which condenses at a temperature of 600° will pass as on oil to the bottom of the manifold pipes and out through the pipe E, while the vapor which is not condensed will pass on to the next condenser, where substantially the same operation will be gone through. As many products with different fire-tests may be extracted as there are condensers with baths of different temperatures employed. The temperature at which the different products of petroleum evaporate and boil does not depend merely on the density of the hydrocarbon giving off the vapors, the high-density petroleum residuum or petroleum-tar retaining, by mass attraction or affinity, oils of a much lower boiling-point than the existing temperature of the boiling oils. In order to overcome this peculiarity, and to produce distillates that correspond in boiling-point to the temperature to which the tar was subjected in its manufacture, and also to separate the different gravities of hydrocarbon vapors produced by decomposition of the most complex hydrocarbon, different temperature condensing-baths have been employed, condensing the different gravity vapors at their respective temperatures. I find by experimenting that the mass attraction of the condensed liquid hydrocarbon will almost entirely condense vapors that would remain in a state of vapor at their condensing-temperature if it were not for the affinity of the liquid hydrocarbon. I find that a hydrocarbon of 41° Baumé gravity and 550° boiling-point will condense at a temperature of 250° benzine-vapor that boiled at 180°. A liquid hydrocarbon oil with a high boiling-point—say 400° Fahrenheit—will, even at that temperature, condense by direct contact in a somewhat confined chamber the vapors of other hydrocarbon oils of a much lower boiling-point, even those below 100° Fahrenheit, thereby greatly reducing the fire-test of the first. This is due to a well-known law of mass attraction, by which liquids of different densities are held together in a mechanical mixture, even though the compound be exposed to a temperature higher than the boiling-point of some of them. The same law favors the condensation of vapors of light density with those of a heavier, when both are of so similar a character as to be readily diffused in the mixture when condensed. A liquid hydrocarbon oil condenses by its mass attraction or affinity vapors from the atmosphere in which it is condensed, which would have remained in a state of vapor had it not been for the presence of such liquid hydrocarbon oil. To avoid this condensation of objectionable light vapors into the liquid current of the heavy ones condensed by both, I introduce a current of steam, flowing preferably in an opposite direction to the liquid current, which, by the high temperature of the vapor, becomes superheated, and by its increased velocity, its buoyancy, and its lack of affinity for the liquid current, the whole atmosphere of the condensing-chamber being less dense as regards hydrocarbon vapors, carries forward the vapors naturally incondensable at the temperature of the bath to the succeeding condensers of lower temperature, whereby the fire-test of those portions that are condensed in a bath of any given temperature will much more nearly correspond in degree to that of said temperature. On account of this peculiarity, fractional condensation of the hydrocarbon has given results far remote from what theory justified us to expect. I find that mass attraction almost ceases if the volume of the vapors passing through the different temperature condensers is augmented by the addition of a vapor or gas that the hydrocarbons have no affinity for. By introducing steam, deoxidized air, (the oxygen of which has been converted into carbonic acid or oxide,) or even a fixed hydrocarbon gas into the hydrocarbon vapor coming from the still before entering condenser No. 1, where a hot-oil bath keeps the condensing-pipes at 500° Fahrenheit, I found that the oil condensed at this temperature gave off one and one-half per cent. of vapor, if heated to 500° Fahrenheit, when steam had been used to increase the volume of vapor and decrease the mass attraction of the condensed liquid; but twenty per cent. if the vapors alone were subjected to this same condensing-temperature. This discovery allows us to take the small percentage of extremely heavy oil, which is injurious in burning oil from the distillate, and also to produce heavy oil containing no light oil whatever, increasing its fire-test and making these heavy oils absolutely inodorous.

I am aware that naphtha and light oils have been vaporized by steam and then passed through a series of condensers containing water at different temperatures, the first condenser containing a bath of water at a temperature of from 50° to 60°, and condensing naphtha at about 80° gravity, the next succeeding condenser having a condensing-bath of from 40° to 50°, which condenses and retains naphtha of about 90° gravity. In this form of apparatus the vapor is passed into the water and in direct contact therewith, and the condensed products float on the surface of the water and are drawn off by suitable pipes.

I am also aware that superheated steam has been injected into a still to assist in vaporizing the oil, the vapor of which is passed through a condensing-bath the temperature of which is above the boiling-point of water; but in such case the superheated steam is used simply to assist in vaporizing the oil.

I am also aware that the pipe for conducting vapor from an oil-still to the condenser has been perforated throughout a portion of its length, and such perforated portion inclosed by a steam-drum, whereby the vapors, in passing from the still to the condenser, are subjected to the direct action of a body of steam; and hence I would have it understood that I make no claim to such process.

My improvement consists in introducing steam or equivalent vapor into the vapor from the still, and then passing the mixture through a series of condensers, the first condenser of the series being provided with a bath the temperature of which is above 212° Fahrenheit.

I make no claim in this application to the process for the fractional distillation of hydrocarbon oils, consisting in vaporizing the oil and passing it through a series of condensers one of which is provided with a bath of a temperature exceeding 212° Fahrenheit, the baths of the condensers being kept separate from each other and from the still, and collecting the condensed vapors from each condenser, or to the above process limited to causing the condensed and uncondensed vapors to flow in different directions, as such subjects-matter are reserved for my application filed January 10, 1881.

What I claim is—

1. A process for the fractional distillation of hydrocarbon oils, consisting in introducing into the vapor from the still a vapor for which hydrocarbon oil has little or no affinity, and passing together such vapors through a series of condensers of different temperatures, substantially as set forth.

2. A process for the fractional distillation of hydrocarbon oils, consisting in vaporizing the hydrocarbon oil, then commingling therewith a vapor for which hydrocarbon oil has little or no affinity, and passing such mixed vapors through a condenser provided with a bath the temperature of which is above the boiling-point of water, substantially as set forth.

3. A process for the fractional distillation of hydrocarbon oils, consisting in vaporizing hydrocarbon oil, then commingling therewith a vapor for which hydrocarbon oil has little or no affinity, and passing such mixed vapors through a series of condensers, the first condenser having a bath the temperature of which is above 212° Fahrenheit, the baths of the succeeding condensers being of less temperature than the first, and separately collecting the condensed products of each condenser, substantially as set forth.

4. A process for the fractional distillation of hydrocarbon oils, consisting in commingling with the vapor from the still a vapor for which hydrocarbon oil has little or no affinity, and passing such mixed vapors upwardly through a condenser, in opposition to the flow of the condensed vapors, substantially as set forth.

5. In an apparatus for the fractional distillation of hydrocarbon oils, the combination, with a condenser provided with a vapor-conduit, of pipes for supplying mixed vapor of hydrocarbon oils and steam or equivalent vapor to the lower portion of the condenser, substantially as set forth.

6. In an apparatus for the fractional distillation of hydrocarbon oils, a series of condensers connected with each other, each condenser consisting of a chamber for a condensing-bath, zigzag pipes located in the chamber and arranged to conduct the vapor upwardly through the condensing-baths, and conduits connected with each condenser for separately collecting the condensed products of each condenser, substantially as set forth.

7. In an apparatus for the fractional distillation of hydrocarbon oils, a condenser provided with circulating-conduits for the hydrocarbon vapor, a pipe communicating with the inlet of said circulating-conduits for supplying vapor thereto, and another pipe communicating with said inlet for discharging the condensed vapors that form in the pipes, substantially as set forth.

In testimony whereof I have signed my name to this specification in the presence of two subscribing witnesses.

HERMAN FRASCH.

Witnesses:
JNO. CROWELL, Jr.,
F. O. McCLEARY.